P. M. FAVRE-BULLE.
ROTARY SPEED INDICATOR.
APPLICATION FILED JUNE 6, 1919.
1,414,268.
Patented Apr. 25, 1922.
2 SHEETS—SHEET 1.
Fig. 1
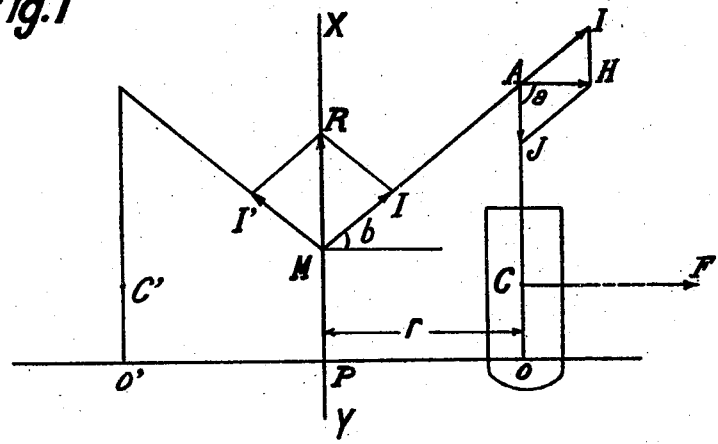
Fig. 3
Fig. 4
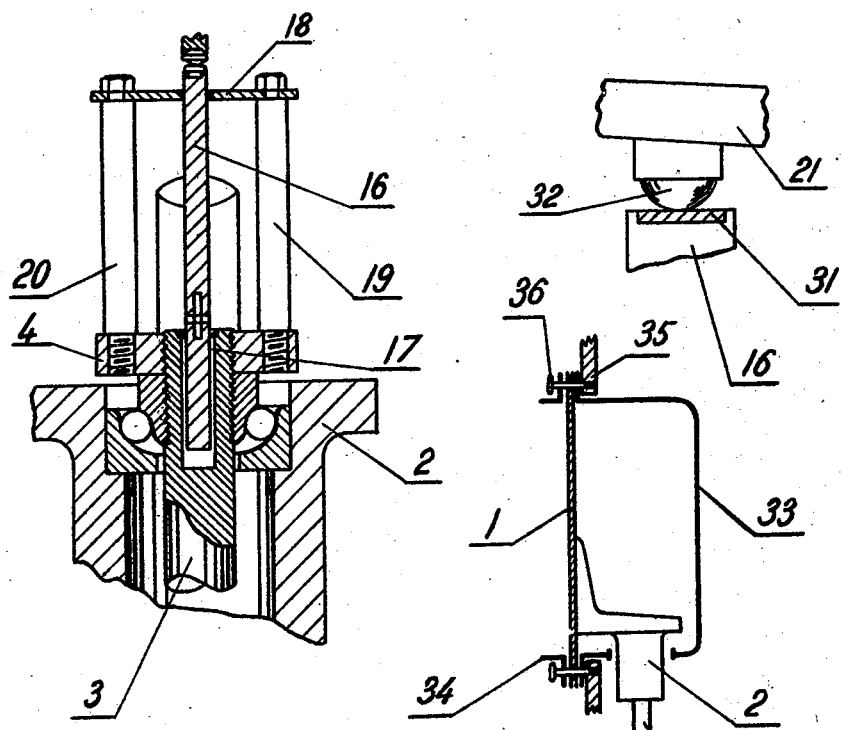
Fig. 5
Inventor
P. M. Favre-Bulle
By H. R. Kerslake
Atty.

P. M. FAVRE-BULLE.
ROTARY SPEED INDICATOR.
APPLICATION FILED JUNE 6, 1919.
1,414,268.
Patented Apr. 25, 1922.
2 SHEETS—SHEET 2.
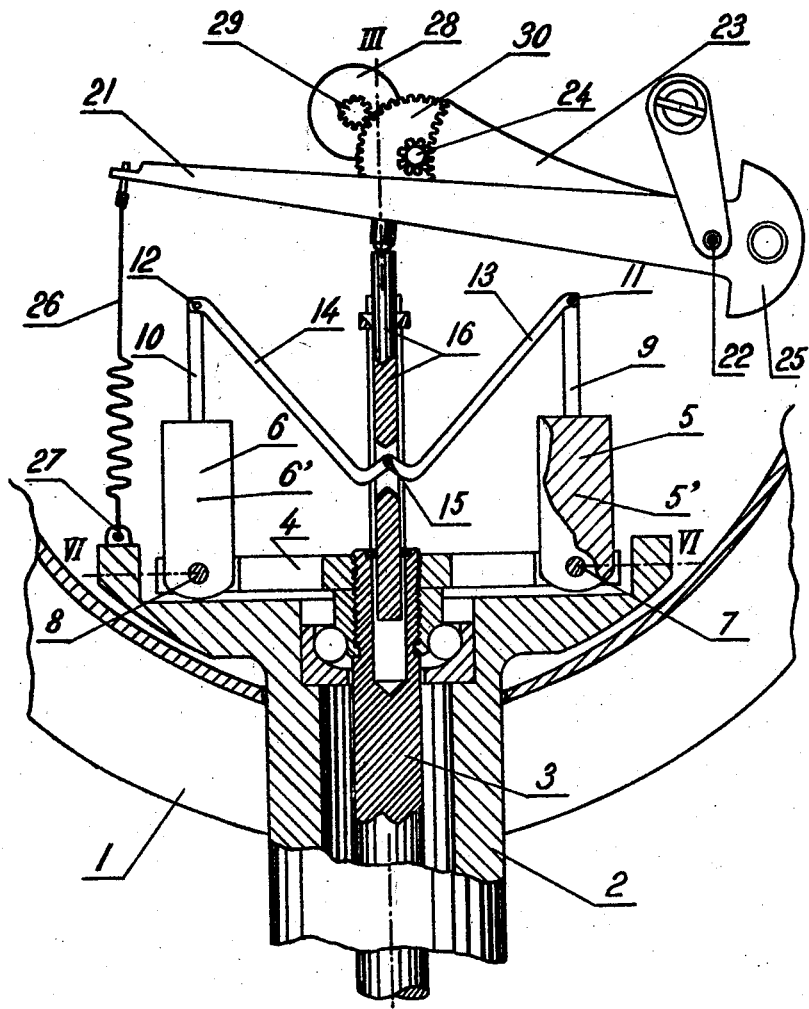
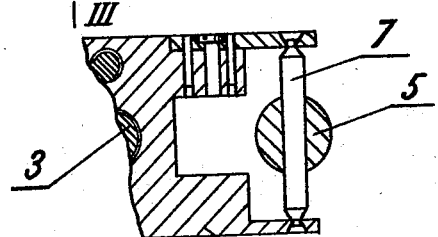
Inventor
P. M. Favre-Bulle
By H. R. Kerslake
Attys.

UNITED STATES PATENT OFFICE.

PHILIPPE MAURICE FAVRE-BULLE, OF BOULOGNE-SUR-SEINE, FRANCE.

ROTARY SPEED INDICATOR.

1,414,268.     Specification of Letters Patent.      Patented Apr. 25, 1922.

Application filed June 6, 1919. Serial No. 302,312.

(GRANTED UNDER THE PROVISIONS OF THE ACT OF MARCH 3, 1921, 41 STAT. L., 1313.)

*To all whom it may concern:*

Be it known that I, PHILIPPE MAURICE FAVRE-BULLE, otherwise known as FAVRE-HEINRICH, a citizen of the French Republic, residing at No. 17 Rue Gambetta, Boulogne-sur-Seine, France, have invented certain new and useful Improvements in Rotary Speed Indicators, (for which I have filed an application in France October 12, 1917, Patent No. 493,877,) of which the following is a specification.

This invention has for its object to provide an improved rotary speed indicator, that is to say, an apparatus for indicating the number of revolutions of a rotating member.

The improved speed indicator comprises a shaft which is revolved by motion transmitted from the member the number of revolutions of which it is desired to indicate. This shaft carries two rocking masses which are adapted to move apart by the action of centrifugal force. The movement of these masses causes an indicating needle to rotate past a graduated scale. This indicating needle assumes a position of equilibrium under the influence of centrifugal force and an opposing spring. The connection between the masses subjected to centrifugal force and the indicating needle is such that the movements of the latter are proportional to the speed of rotation of the member the number of revolutions of which it is desired to ascertain.

Fig. 1 illustrates diagrammatically the principle of the improved speed indicator;

Fig. 2 is a view in elevation partly in section;

Fig. 3 is a view in elevation partly in section on the line III, III of Fig. 2;

Fig. 4 illustrates on a larger scale the contact between the rod acted upon by centrifugal force and the lever that guides the needle;

Fig. 5 is a diagrammatic view of the manner of fixing the speed indicator to a supporting wall; and Fig. 6 is a sectional view on the line VI, VI of Fig. 2.

Referring more particularly to the Fig. 1, let XY be the vertical axis of the apparatus, OPO' the plate on which is pivoted at O a rod OA carrying a mass having its center of gravity at C, AM a rod connecting the rod OA to the vertical axis.

By the action of the centrifugal force the mass is subjected to a force applied at C and equal to $$F = mw^2 r$$

The point O being fixed said force will be replaced by the parallel force H applied at A and equal:

$$H = F \frac{OC}{OA} = KF$$

We may break up the force H along the directions AO and MA. It is replaced by J which, passing through the fixed point O, is nullified, and I which will be transmitted at M.

By doing the same with the symmetrical mass whose center of gravity is C', we get at M two forces I and I', symmetrical with respect to the axis XY, and the resultant R of which is directed along said axis:

We have $$R = 2I \sin b$$

On the other hand in the triangle AIH $$\frac{I}{\sin a} = \frac{J}{\sin b} = \frac{H}{\sin (a+b)}$$

from which $$R = 2 \frac{H \sin a \sin b}{\sin (a+b)}$$

now:

$$H = KF = Kmw^2 r$$

from which $$R = \frac{2Kmw^2 r \sin a \sin b}{\sin (a+b)}$$

We put $2Km = \text{constant} = K^1$ and we simplify:

$$R = \frac{K^1 w^2 r}{\cot gb + \cot ga}$$

If 1°/a is approximately 90°
2°/b is sufficiently acute
cot ga is very slight and negligible before cot gb we thus have $$R = \frac{K^1 w^2 r}{\cot gb} = K^1 w^2 r tgb$$

This expression is composed of two variable terms

1°/, which, within sufficiently approximate limits may be considered as proportional to a power of $w$ greater than 2.

2°/$tgb$, which is also function of $w$.

If we make the curve of $tgb$ operate with $w$ it is found that $tgb$ decreases when $w$ increases and may be taken as proportional to a power of $w$ less than O.

It is evident that by regulating the lengths of OP, OA, OM by trial we may obtain a value of R which within narrow limits varies proportional to $w$.

In the devices constructed OP=2 centimeters, OA=2.75 centimeters and AM=2.50 centimeters, and speed measures between 600 and 1200 revolutions per minute are obtained by the apparatus. The ratio (relation) between the spaces comprised between 2 consecutive divisions of the dial does not exceed 1, 3, sufficient for practical requirements.

Summarizing, the following conditions must be present in the apparatus $a$ remaining approximate to 90°

$b$ remaining very acute (always less than 60°) Referring now to the Figs. 2, 3, 4, 1 is the frame plate to which is fixed a sleeve 2 that serves as a bearing for a shaft 3, which is adapted to be connected to the device whose speed of rotation it is desired to measure. The shaft 3 ends in a plate 4 to which are fixed by means of their lower ends cylindrical masses 5, 6, whose centers of gravity are 5', 6', capable of rocking on pivot pins 7, 8, at right-angles to the axis of rotation.

The cylindrical masses 5 and 6 are prolonged by arms 9 and 10 to the ends of which are pivotally jointed at 11, 12, connecting rods 13, 14, the two other ends of which are connected at 15 to the lower part of a movable rod 16. This rod 16 is guided at its lower part (Fig. 3) in a sleeve 17 of the plate 4 and at its upper part in a cross piece 18 supported by two pillars 19 and 20 fixed to the plate 4.

The pivots 7 and 8 are placed at a relatively great distance from the general axis of the apparatus and the centers of gravity of the centrifugal masses 5 and 6 very close to these pivots, so that when the speed of rotation varies the distance of these centers of gravity to the general axis of the apparatus varies slightly. The result is that the centrifugal force varies substantially in proportion to the square of the speed.

The lengths of the different rods and links are determined by experiment in such manner that said elevation of the rod 16 be substantially proportional to the angular speed of the source of movement within certain determined limits. It is possible to realize this proportioning if the rods 9 and 10 remain approximately parallel with the vertical axis and the angle of the rods 13 and 14 with the horizontal be very acute and in any case is less than 60°.

Upon the upper part of the rod 16 there bears a lever 21 which is fulcrumed at 22 and has fixed to it a toothed sector 23 which meshes with a pinion 24 mounted on the axle of the indicating needle. The lever 21 and the toothed sector 23 fixed thereto are balanced as regards the axis of rotation 22 by a weight 25 which can be adjusted as to position. The lever 21 is acted upon at its end in the opposite direction by a coiled spring 26 attached at its other end at 27 to a fixed point of the frame. This spring is held only at its two ends, and is otherwise completely free. Under these conditions it is not subjected to any friction, and the effort which it exerts upon the end of the lever 21 is proportional to its elongation, and consequently to the angular displacements of the lever 21. That is to say, the spring may be so chosen that its pull will constantly counterbalance the raising strain exerted by the rod 16.

The shaft 3 will be generally connected to the rotary device whose speed of rotation it is desired to measure, by means of a flexible shaft consisting of a cable revolving in a sheath. Transmissions of this kind have the defect of not following in an absolutely regular manner the motion of the rotating device, owing to the friction occurring between the cable and its sheath, so that the shaft 3 will be subjected to sudden fluctuations of speed. The result will be that the rod 16 will be subjected to sudden risings which will cause the indicating needle to jump along its scale. This drawback is avoided according to the present invention by causing the indicating needle to be driven by a fly-wheel 28 of considerable mass relatively to the needle, this driving being effected by means of a small pinion 29 fixed on the axle of the fly-wheel, and of a large pinion 30 fixed on the axle of the needle.

When the needle is moving slowly, it has no difficulty in causing the fly-wheel to turn, and the presence of the latter does not change in any way the position of equilibrium of the needle. But if the needle is subjected to a sudden movement the momentum of this movement will be absorbed by a sudden jumping around of the fly-wheel 28, with the result that jumps of the needle will be practically prevented.

The contact between the rod 16 which is subjected to rotation and the lever 21 which is fixed, presents some difficulty when it is desired to avoid friction and wear.

In order to remedy this drawback in the improved apparatus according to the present invention, the rod terminates (Fig. 4) in a flat jewel 31, and the lever 21 carries a spherical jewel 32 which rests upon the first mentioned jewel. Owing to the shape of those surfaces the movements of the rod 16 will produce an insignificant variation in the length of the leverage between the point of contact and the fulcrum 22 of the lever 21. Moreover, the space comprised between the two jewels 31 and 32 around their point of contact has such a shape that if a drop of oil is placed thereon, this oil will form a meniscus having an outer concave surface, the capillary tension of which is sufficient to prevent any projection of the oil during the rotation of the rod 16.

As above stated, the moving parts of the speed indicator are supported by the sleeve 2 which is fixed on the frame plate 1 (Fig. 5). The casing of the apparatus consists of a cover 33 through which the sleeve 2 extends freely without touching it; it is provided with a flange bearing against the frame plate 1. It is completed by a glass cover 34, likewise provided with a flange, fitted to the other side of the frame plate.

When the apparatus is to be fixed to a supporting wall 35, this is done by means of a certaian number of screws 36 passing through the two flanges and the frame plate. The frame plate 1 is thus fixed directly on the wall 35, and this arrangement has the advantage of giving to the frame plate a great rigidity in withstanding the strains transmitted by the driving gear or shafting.

In mounting similar apparatus employed hitherto, the frame plate supporting the mechanism is generally fixed in the casing, and it is the casing that is fixed to the supporting wall. That arrangement affords an insufficient degree of rigidity. The direct fixing of the frame plate to the supporting wall according to the present invention allows also of considerably reducing the weight of the casing, which is a saving.

What I claim is:—

1. In a rotary speed indicator, the combination of a shaft receiving rotation from the member whose speed of rotation it is to measure, a plate perpendicular to said shaft, pivots carried by the plate, two centrifugal masses fixed on the pivots, two arms fixed on said centrifugal masses in the same diametral plane passing through the axis of the plate, the said arms being nearly parallel with the said axis, a movable rod at the center of said plate and perpendicular thereto, oblique rods fixed on the one hand to the upper end of said arms and on the other to the base of said rod, the oblique rods forming with the horizontal an angle less than 60°, a balanced rocking lever bearing upon the end of said rod, a toothed sector fixed to said lever, a framing, and a coiled spring entirely free throughout its length fixed to one end to said lever and at its other end to the framing.

2. In a rotary speed indicator, the combination of a shaft receiving rotation from the member whose speed of rotation it is to measure, a plate perpendicular to said shaft, pivots on said plate, two centrifugal masses fixed on said pivots, two arms fixed on said centrifugal masses in the same diametral plane passing through the axis of the plate, the said arms being nearly parallel with the said axis, a movable rod at the center of said plate and perpendicular thereto, a bearing member on the upper end of said rod, oblique rods fixed to the upper ends of the arms and to the base of said rod, the oblique rods forming with the horizontal an angle less than 60°, a balanced rocking lever bearing upon the end of said rod, a toothed sector fixed on said lever, a framing, and a coiled spring entirely free throughout its length fixed to one end of the lever and to its other end with the framing.

3. In a rotary speed indicator, the combination of a shaft receiving rotation from the member whose speed of rotation it is to measure, a plate perpendicular to said shaft, pivots carried by the plate, two centrifugal masses fixed on said pivots, two arms fixed on said centrifugal masses in the same diametral plane passing through the axis of the plate, the said arms being nearly parallel with the said axis, a movable rod at the center of said plate and perpendicular thereto, oblique rods fixed on the one hand to the upper end of said arms and on the other to the base of said rod, the oblique rods forming with the horizontal an angle less than 60°, a balanced rocking lever carrying a bearing member for coaction with the bearing on the rod, a toothed sector fixed to said lever, a small pinion meshing with said sector, a toothed wheel integral with said small pinion, a second small pinion meshing with said toothed wheel, a circular fly wheel integral with the last mentioned pinion, a framing and a coiled spring entirely free throughout its length fixed at one end of the lever and its other end to the framing.

In testimony whereof I have signed my name to this specification.

PHILIPPE MAURICE FAVRE-BULLE.